(12) United States Patent
Larson (10) Patent No.: US 6,471,028 B1
(45) Date of Patent: Oct. 29, 2002

(54) MECHANICAL MODULE WITH VARIABLE CHARACTERISTIC SET BY THE ACT OF INSTALLATION

(75) Inventor: Lowell Van Lund Larson, Huntington Beach, CA (US)

(73) Assignee: Moog Inc., East Aurora, NY (US)

( * ) Notice: Subject to any disclaimer, the term of this patent is extended or adjusted under 35 U.S.C. 154(b) by 17 days.

(21) Appl. No.: 09/657,299

(22) Filed: Sep. 6, 2000

(51) Int. Cl.[7] ................................................. F16P 3/00
(52) U.S. Cl. .................. 192/223.3; 192/137; 192/93 A; 192/70.2; 192/70.23
(58) Field of Search ........................... 192/223.3, 223.2, 192/223, 15, 70.2, 70.23, 93 R, 93 A, 93 C, 137, 150

(56) References Cited

U.S. PATENT DOCUMENTS

| | | | | |
|---|---|---|---|---|
| 3,194,366 A | * | 7/1965 | Hensel | 192/223.2 |
| 3,667,578 A | * | 6/1972 | Johnson | 192/223.3 |
| 3,994,376 A | * | 11/1976 | Fulghum | 192/223.3 |
| 4,483,429 A | * | 11/1984 | Tiedeman | 192/223.3 |

* cited by examiner

*Primary Examiner*—Saul Rodriguez
(74) *Attorney, Agent, or Firm*—Phillips, Lytle, Hitchcock, Blaine & Huber LLP (57) ABSTRACT

A torque-limiting module (20) is adapted to be mounted on a body (21) at any of a plurality of locations. Each location has a particular mounting geometry that mandates the relative position and orientation of the module relative to the body. The body includes a housing (28) adapted to be mounted on the body, in input shaft (22), an output shaft (29), a coupling (30) between the shafts, a brake (31) arranged to act between the housing and output shaft for braking the shafts when the torque transmitted by the output shaft exceeds a predetermined value, a spring (84) urging the brake to move toward a position at which the output shaft will be released, a cam surface (25) mounted on the body at each of the locations, a cam follower (32) mounted on the module for movement along an axis and engageable with the cam surface at any location, and wherein the module has a variable characteristic, such as torque, that is settable as a function of the position of the cam follower relative to the module.

9 Claims, 6 Drawing Sheets

MECHANICAL MODULE WITH VARIABLE CHARACTERISTIC SET BY THE ACT OF INSTALLATION

TECHNICAL FIELD

The present invention relates generally to torque limiters for preventing damage to mechanical actuation systems, and, more particularly, to an improved torque limiter in which the setting of a variable (e.g., maximum torque) is set upon, or as a condition precedent to, installation of a mechanical module on a supporting body.

BACKGROUND ART

It is known to provide torque limiters to prevent damage to the components of a mechanical actuation system in the event of a jam. One example of such a system would be the leading edge slat system for an aircraft. In this system, power in the form of mechanical torque and rotary motion is transmitted by a torque shaft along the leading edge of an aircraft wing. Power is extracted from the torque shaft by a series of geared mechanical actuators at various locations spaced there along, and is used to drive several slat surfaces simultaneously. There may be one or more actuators per slat surface, and each actuator is typically protected by a torque limiter that is set to transmit torque to the associated actuator that is sufficient to overcome anticipated normal operating loads but it is not large enough to damage the actuator or any other part of the system in the event of a jam. Typically, these slat surfaces differ widely in area. Hence, the operating loads to which the various torque limiter are set, will vary similarly.

The prior art contemplates the use of a different torque limiter for each actuator, with an operating cost penalty because of the lack of a common component, or the use of a common component at each location with a structural weight penalty in those parts of the system where the surfaces and loads are smaller. Heretofore, it has been thought that a common manually-adjustable torque limiter that would be replaceable in the field, could not be used for safety reasons.

DISCLOSURE OF THE INVENTION

With parenthetical reference to the corresponding parts, portions or surfaces of the disclosed embodiment, merely for purposes of illustration and not by way of limitation, the present invention, in one aspect, provides an improvement in a mechanical module (e.g., 20 in FIG. 1) that is adapted to be interchangeably mounted on a body (21) at a particular location. The body has at each of the locations a particular geometry that cooperates with the module to mandate the relative position of the module with respect to the body at such location. The module has a housing (28) adapted to be mounted on the body and has a setting member (32) that is movable relative to the housing within a permissible range of movement to set a functional variable characteristic (e.g., torque) of the module. The improvement broadly comprises: the setting member engaging the body geometry at any of such locations at only one permissible relative position within the range when the module is mounted on the body at such location; the value of the variable characteristic being determined by the position of the setting member relative to the housing when the module is mounted on the body at such location; whereby the variable characteristic will be determined automatically either during, or as a condition precedent to, mounting the module on the body.

The location mentioned above may possibly be one of a plurality of locations. In this event, each location may have a different and unique mounting geometry that is largely a function of the anticipated load. If the anticipated load differs at each location, then the mounting geometry between the body and module will be different at each location to insure that the variable characteristic is properly set for the anticipated load at that location. However, if the anticipated load is the same at each of two locations, then the mounting geometry may be the same at those locations.

In another aspect, the improvement comprises: the value of the variable characteristic being determined by the position of the setting member relative to the body, as constrained by the body geometry at any such location, the setting member and body being so configured and arranged as to permit the module to be mounted on the body at any such location only when the setting member is in the preselected position for such location, and to prevent the module from being mounted on the body when the setting member is in a position other than the preselected position for such location; whereby the module is prevented from being mounted on the body unless the setting member is in the preselected position.

In still another aspect, the invention provides a torque-limiting module adapted to be mounted on a body at any of a plurality of locations, the body having at each location mounting features (85) that mandate the relative position and orientation of the module relative to the body. The improved module comprises: a housing (28) adapted to be mounted on the body; an input shaft (22); an output shaft (29); a coupling (30) between the shafts; a brake (31) arranged to act between the housing and the output shaft for selectively braking the shafts when the torque transmitted by the output shaft exceeds a predetermined torque value; a cam surface (25) mounted on the body at each of the locations; and a cam follower (32) mounted on the module for movement along an axis, and engageable with the cam surface at any location. The module is operatively arranged to selectively set the predetermined torque value as a function of the position of the cam follower relative to the module; whereby the predetermined torque value is set, either automatically during, or as a condition precedent to, mounting the module on the body at any of such locations.

Accordingly, the general object of this invention is to provide an improved torque limiter.

Another object is to provide an improved torque-limiting module that has a settable variable characteristic, such as maximum torque, and that may be mounted at any of a number of locations on a body.

Another object is to provide a common torque limiter that is adapted to be mounted on a body at any of a plurality of locations, and in which the maximum torque is individually determined by the particular mounting geometry between the module and body at a given location.

Another object is to provide an improved torque limiter in which the value of maximum torque is determined automatically upon the mounting of the module on a body.

Another object is to provide an improved torque limiter in which the value of maximum torque must be determined as a condition precedent to mounting the module on a body.

Still another object is to provide an improved torque limiter that is adapted to be mounted on a body at any of a plurality of locations and which requires that a characteristic, such as maximum torque, be set as a function of the geometry of the particular location at which the module is mounted on the body.

These and other objects and advantages will become apparent from the foregoing and ongoing written specification, the drawings, and the appended claims.

DESCRIPTION OF THE PREFERRED EMBODIMENTS

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis or elongation, or axis of rotation, as appropriate.

FIRST EMBODIMENT (FIGS. 1–5)

Referring now to the drawings, and, more particularly, to FIGS. 1–5 thereof, the present invention broadly provides an improved mechanical module, generally indicated at 20, that is adapted to be mounted on the body, of which a fragmentary portion is indicated at 21, at a particular location. An input torque shaft, generally indicated at 22, is journaled on the body for rotation relative thereto about axis x—x, and is shown as penetrating the module. Torque shaft 22 supplies an input torque to module 20, as described infra.

Figure 1:
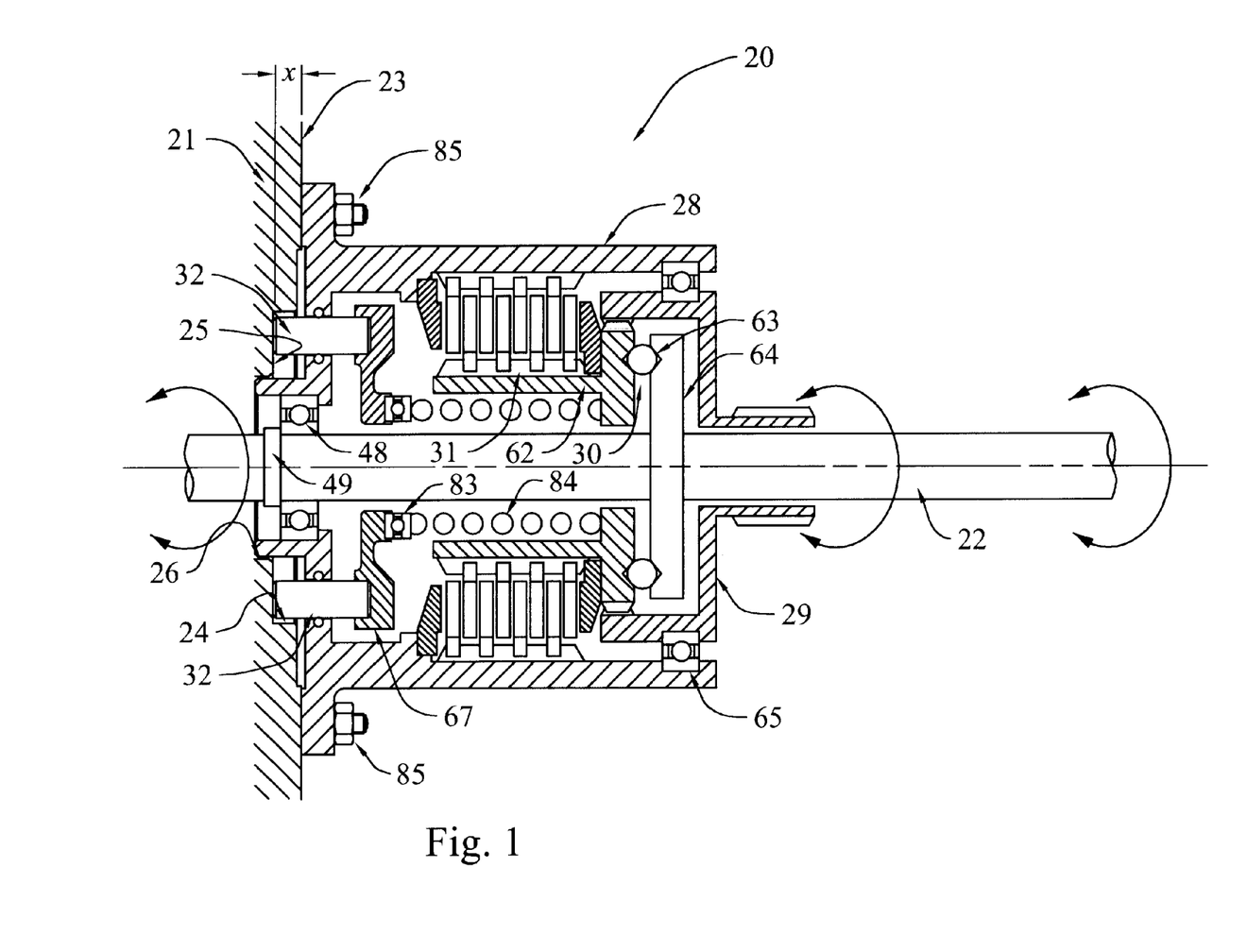
FIG. 1 is a schematic view, partly in vertical section and partly in elevation, of an improved torque-limiting module mounted on a body.

As best shown in FIG. 1, the body includes a rightwardly-facing planar vertical surface 23, and a recess extending leftwardly into the body from surface 23. This recess is bounded by an inwardly-facing horizontal cylindrical surface 24 extending leftwardly from the inner margin of surface 23, a rightwardly-facing annular vertical bottom surface 25, and an inwardly-facing surface 26 continuing leftwardly therefrom. In this form, recess bottom surface 25 is substantially planar, and forms a cam surface that is arranged in a plane substantially perpendicular to shaft axis x—x.

Module 20 broadly includes a housing 28; an output shaft 29; a coupling 30 for causing the shafts to move axially relative to one another when the shafts move rotatably relative to one another; a brake 31; and two cam followers, severally indicated at 32, that are operatively arranged to engage the coupling and the cam surface 25 to vary a characteristic of the module. In this form, the characteristic is the maximum torque transmitted from the module to the output shaft.

Figure 2:
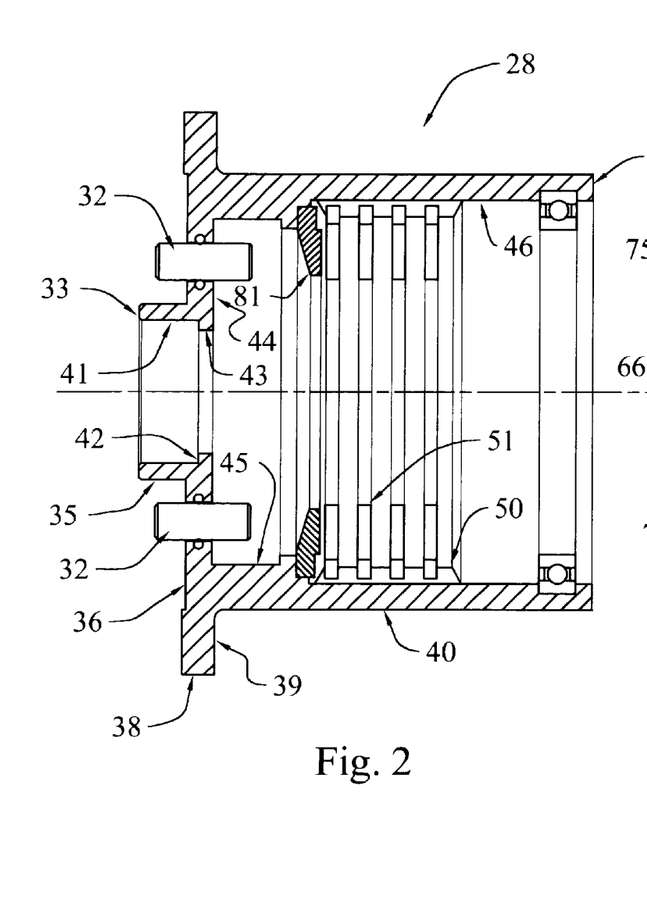
FIG. 2 is a view, partly in vertical section and partly in elevation, of the housing assembly shown in FIG. 1.

Referring now to FIG. 2, housing 29 is shown as being a horizontally-elongated specially-configured member having an annular vertical left end face 33; an annular vertical right end face 34; and an outer surface that sequentially includes (from left to right in FIG. 2): an outwardly-facing horizontal cylindrical surface 35 extending rightwardly from the outer margin of left end face 33, a leftwardly-facing annular vertical surface 36, an outwardly-facing horizontal cylindrical surface 38, a rightwardly-facing annular vertical surface 39, and an outwardly-facing horizontal cylindrical surface 40 continuing rightwardly therefrom to join the outer margin of right end face 34. The housing also has an inner surface that sequentially includes (again from left to right in FIG. 2): an inwardly-facing horizontal cylindrical surface 41 extending rightwardly from the inner margin of left end face 33, a leftwardly-facing annular vertical surface 42, an inwardly-facing horizontal cylindrical surface 43, a rightwardly-facing annular vertical surface 44, an inwardly-facing horizontal cylindrical surface 45, a transitional portion, and an inwardly-facing horizontal cylindrical surface 46 continuing rightwardly therefrom to join the inner margin of right end face 34. A bearing 48 is operatively arranged between an intermediate portion of shaft 22 to the right of flange 49, and housing surfaces 41, 42. A plurality of axially-spaced annular discs are mounted on a key 50 between housing surface 45 and 46, and are fixed to the housing. These discs are severally indicated at 51.

Figure 4:
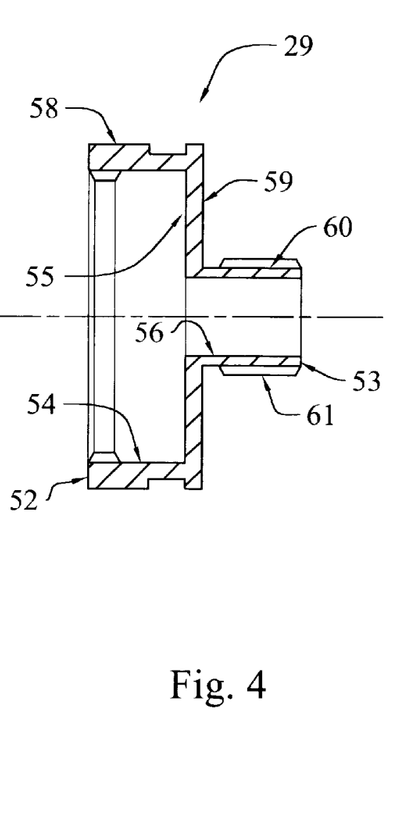
FIG. 4 is a view, partly in vertical section and partly in elevation, of the output shaft shown in FIG. 1.

As best shown in FIG. 4, the output shaft 29 is a horizontally-elongated specially-configured member having an annular vertical left end face 52; an annular vertical right end face 53; and an inner surface that sequentially includes (from left to right in FIG. 4): an inwardly-facing horizontal cylindrical surface 54 extending rightwardly from the inner margin of left end face 52, a leftwardly-facing annular vertical surface 55, and inwardly-facing horizontal cylindrical surface 56 continuing rightwardly therefrom to join the inner margin of right end face 53. The output shaft 29 also has an outer surface that sequentially includes (again from left to right in FIG. 4) in pertinent part: an outwardly-facing horizontal cylindrical surface 58 extending rightwardly from the outer margin of left end face 53, a rightwardly-facing annular vertical surface 59, and an outwardly-facing horizontal cylindrical surface 60 continuing rightwardly therefrom to join the outer margin of right end face 53. A plurality of splines, severally indicated at 61, extend radially outwardly from surface 60 at various circumferentially-spaced locations thereabout.

Coupling 30 is shown as including a movable coupling member 62; a plurality of balls, severally indicated at 63, arranged between member 62 and a large-diameter flange 64 on the input shaft; and a bearing member 65. The inner and outer races of bearing member 65 are received in annular recesses extending radially into the housing member and output shaft, respectively.

Figure 3:
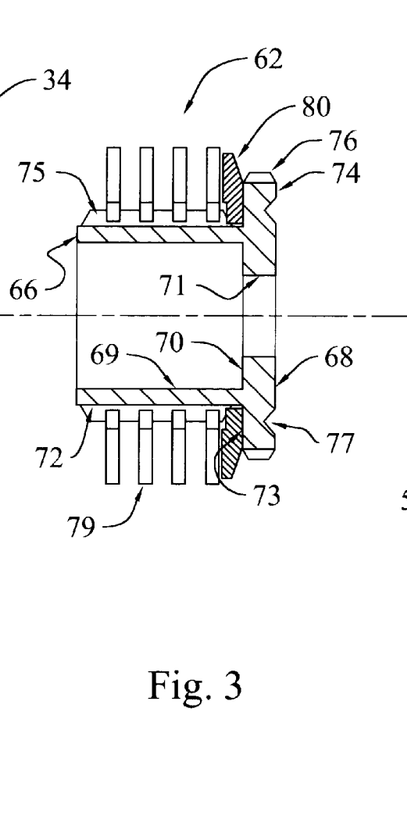
FIG. 3 is a view, partly in vertical section and partly in elevation, of the coupling member shown in FIG. 1.

As best shown in FIG. 3, coupling member 62 is elongated along axis x—x and is specially configured. This member has an annular vertical left end face 66; an annular vertical right end face 68; and an inner surface that sequentially includes (from left-to-right in FIG. 3): an inwardly-facing horizontal cylindrical surface 69 extending-rightwardly from the inner margin of left end face 66, a leftwardly-facing annular vertical surface 70, and an inwardly-facing horizontal cylindrical surface 71 continuing rightwardly therefrom to join the inner margin of right end face 68. Member 62 also as an outer surface that sequentially includes (again from left to right in FIG. 3) in pertinent part: an outwardly-facing horizontal cylindrical surface 72 extending rightwardly from the outer margin of left end face 66, a leftwardly-facing vertical surface 73, and an outwardly-facing horizontal cylindrical surface 74 continuing rightwardly therefrom to join the outer margin of right end face 68. A plurality of longitudinally-extending circumferentially-spaced splines, severally indicated at 75, extend radially outwardly from surface 72. Another plurality of such splines, severally indicated at 76, extend radially outwardly from surface 74 to engage a cooperative set of splines, indicated at 78, extending inwardly from output shaft surface 54.

A plurality of axially-spaced disc-like brake elements, severally indicated at 79, are mounted fast to the coupling member on splines 75, and are positioned interdigitally between stationary discs 51. An annular bearing element, indicated at 80, is mounted on member 62 and is arranged to engage the exposed surface of the rightward most movable disc. Conversely, another annular bearing member, indicated at 81, is mounted on the housing and is arranged to engage the leftwardmost stationary disc.

A plurality of circumferentially-spaced conical recesses, severally indicated at 77, extend leftwardly into member 62 and rightwardly into input shaft flange 64 so as to receive and accommodate a corresponding plurality of balls 63.

Adverting now to FIG. 1, bearing member 67 is shown as being a specially-configured annular member generated about axis x—x. This member includes (from left to right in FIG. 1), in pertinent part: a plurality of sockets to receive the right marginal end portions of cam followers 32, and a bearing 83. A spring 84 is operatively arranged to act between coupling member surface 70 and bearing 83 to urge coupling member 62 to move rightwardly relative to the housing. Such rightward motion is limited by the extent to which balls 82 are seated in the cooperative facing conical recesses 77. In this arrangement, the various fixed and movable discs 51, 79, respectively, are free to rotate relative to one another.

The module is adapted to be mounted on the body by means of a plurality of fasteners, severally indicated at 85. In this position, spring 84 will urge cam followers 32,32 to move leftwardly such that their left end faces will bear against body cam surface 25. When torque below a predetermined value is transmitted to the module via input shaft 22, the coupling balls will remain seated between their respective conical seats on the input shaft flange and the coupling member. Hence, the input shaft and output shaft will rotate together. However, if the output torque exceeds a predetermined maximum torque, then there will be relative angular movement between coupling member 62 and flange 64. This will cause the balls to ride up the walls of conical recesses 77, and will displace coupling member 62 leftwardly relative to the body, against the opposing bias of spring 84. Such leftward movement of member 62 causes the movable brake elements to frictionally engage the stationary brake discs to brake the rotating shafts.

It should be noted that when the device is assembled, the spatial orientation of the housing relative to the body is determined by the mounting holes through which the fasteners 85 are mounted. At the same time, the cam followers, in the form of pins 32, 32, extend leftwardly beyond housing surface 36, and are received in the recess formed in the body at that particular location. The depth of each recess determines the value of the characteristic to be set when the module is mounted on the body at that particular location.

Figure 5:
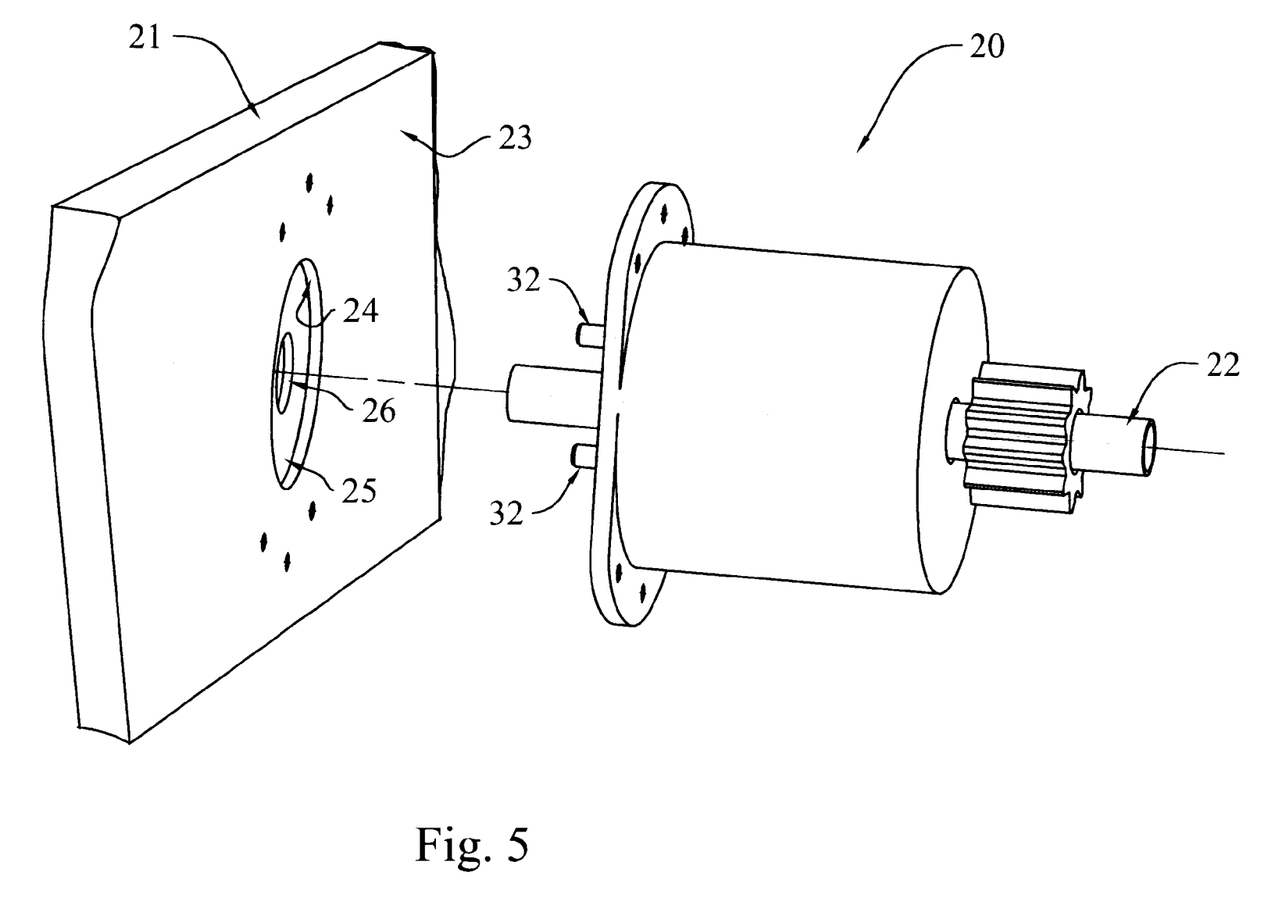
FIG. 5 is a fragmentary perspective exterior view, showing the mechanical module as being in exploded aligned relation to the body.

This mounting relationship is visually depicted in FIG. 5, which depicts the module in exploded aligned relation to the body. Here, the cam followers 32 project leftwardly beyond the end of the module, and are adapted to be received in the body recess and to bear against cam surface 25 when the module is mounted on the body.

Figure 6:
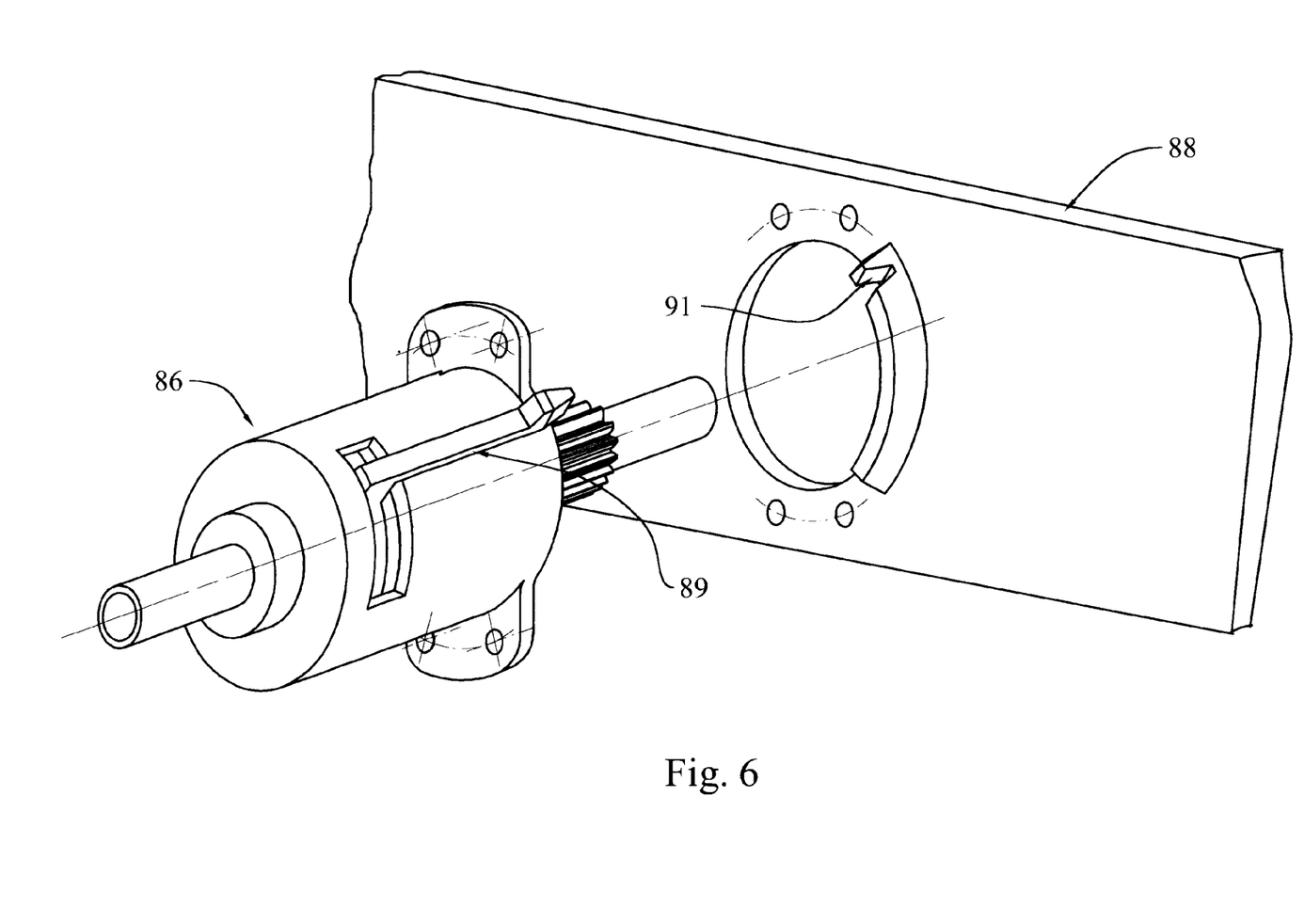
FIG. 6 a perspective view of a second form of an improved torque-limiting module, this view showing this second view of module as being in exploded aligned relation to a body on which it is to be mounted.

SECOND EMBODIMENT (FIG. 6)

FIG. 6 depicts another arrangement in which a variant form of module, generally indicated at 86, is adapted to mounted on another body, fragmentarily indicated at 88. Here again, the body has a plurality of mounting holes that must align with a corresponding plurality of mounting holes on the body to orient the module relative to the body. However, in this form, the module has a settable member, indicated at 89. This settable member has a groove 90 which is adapted to selectively align with and receive a pin 91, which extends outwardly from the body. As will be appreciated, the module may not be mounted on the body unless and until the settable member is oriented in such a position that the pin 91 is received in settable member groove 90. Thus, if a particular module is removed from the body at this location, and another identical module replaces the one just removed, the settable member must be oriented to a particular position, to set the variable characteristic, before the module may be securely mounted on the body.

Figure 7:
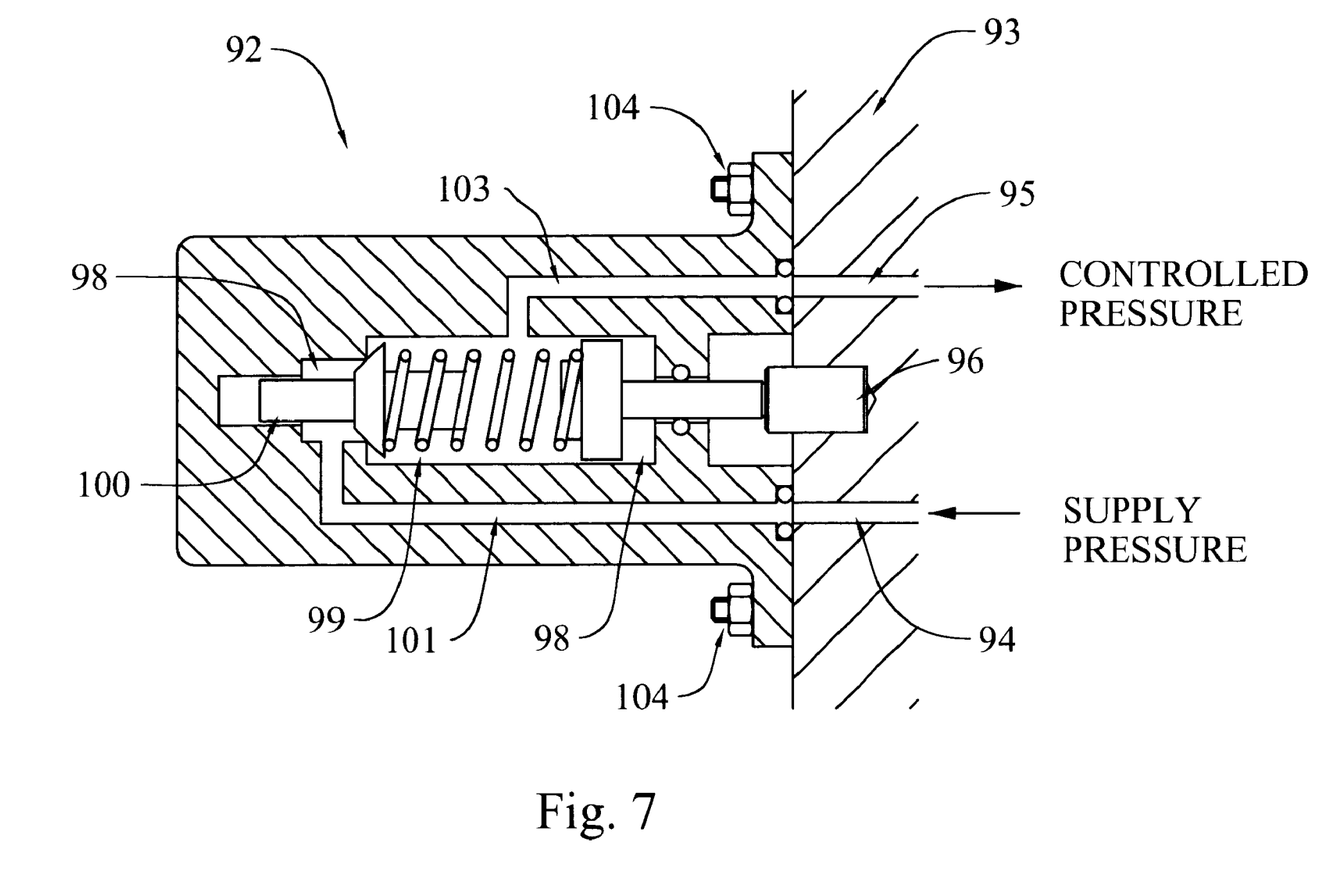
FIG. 7 is a schematic view, partly in vertical cross section and partly in elevation, of a third form of a mechanical module, this form being arranged to control the cracking pressure of a pressure relief valve.

THIRD EMBODIMENT (FIG. 7)

FIG. 7 is provided to illustrate that the characteristic need not necessarily be torque in all cases. FIG. 7 illustrates a type of pressure relief valve, generally indicated at 92, which is adapted to be mounted on a body 93. The body is shown as having passages 94 and 95 that communicate with supply and controlled pressures, respectively. The body also has a central axial recess in which a cylindrical pin 96 is received and fixed. In this form, the module has a labyrinth of internal passageways, a plunger-like member 98 having a rod portion that snarlingly penetrates the housing wall and engages the left marginal end portion of the plug, a spring 99, and a poppet member 100 having a Faustoconical surface that is adapted to be moved axially relative to a seat. Supply pressure is admitted via communicating passageways 94 and 101 to a chamber 102 and acts on the left end face of the poppet. When a pressure differential exists across a poppet sufficient to overcome the bias of spring 99, the poppet member will move rightwardly away from its seat, to allow flow from end chamber 98 via communicating passageways 103, 95 in the housing and body, respectively. Here again, the special orientation of the housing relative to the body is determined by fasteners, severally indicated at 104, with the individual characteristic, in this case the cracking pressure, being determined by the extent to which the left end face of plug 96 extends leftwardly beyond body surface 105.

Figure 8:
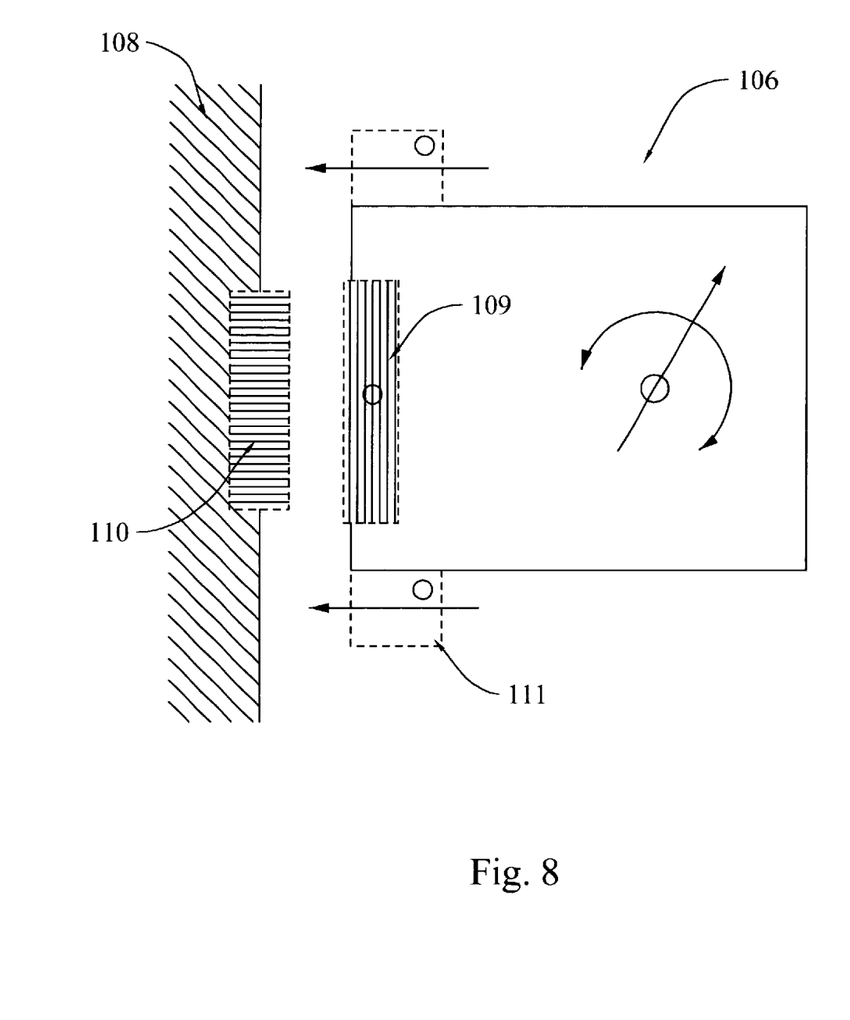
FIG. 8 is a schematic view illustrating the general case of a mechanical module in exploded aligned relation to a body.

FOURTH EMBODIMENT (FIG. 8)

The more general case is illustrated in FIG. 8 This figure schematically depicts a mechanical module, generally indicated at 106, in exploded aligned relation to a body 108. The lines 109 and 110 represent individually cooperative members on the module and body, respectively, that are used to vary the magnitude of the characteristic. The outer phantom flange 111 depicts the means of attaching the module to the body so as to establish the initial orientation therebetween.

Modifications

The present invention expressly contemplates that many changes and modifications may be made. For example, the particular mechanical implementation shown in FIG. 1 is intended to be exemplary only, and should not be deemed as limitative of the scope of the appended claims. Similarly, while in the preferred form, the varied and settable characteristic is torque, it could be cracking pressure, or some other variable quantity as well. The salient feature here is that a plurality of identical modules may be provided. Each module has a particular geometry that cooperates with a corresponding geometry on the body to vary and set a particular characteristic to be established. Hence, a module may be removed and may be replaced by a like module, which will cause the variable to be set to the same desired value when the replacement module is installed on the body.

Therefore, while several preferred forms of the improved mechanical module have been shown and described, and several changes and modifications thereof discussed, persons skilled in this art will readily appreciate that various additional changes and modifications may be made without departing from the spirit of the invention, as defined and differentiated by the following claims.

What is claimed is:

1. In a mechanical module adapted to be interchangeably mounted on a body at any of a plurality of locations, said body having at each of said locations a particular geometry that cooperates with said module to mandate the relative position of said module with respect to said body at such location, said module having a housing adapted to be mounted on said body and having a setting member that is movable relative to said housing within a permissible range of movement to set a functional variable characteristic of said module, the improvement comprising:

said setting member engaging said body geometry at any of such locations at only one permissible relative position within said range when said module is mounted on said body at such location;

the value of said variable characteristic being determined by the position of said setting member relative to said housing when said module is mounted on said body at such location;

whereby said variable characteristic will be determined automatically either during, or as a condition precedent to, mounting said module on said body.

2. The improvement as set forth in claim 1 wherein each location has a different body geometry.

3. The improvement as set forth in claim 1 wherein said module has:

an input shaft for transmitting torque to said module;

an output shaft for transmitting torque from said module; and a brake for braking rotational movement of said shafts when the torque transmitted by said output shaft exceeds a predetermined value; and wherein the setting of the said variable characteristic is the predetermined value of torque transmitted by said output shaft.

4. The improvement as set forth in claim 1 wherein said body geometry includes a cam surface mounted on said body, and wherein said module has a follower mounted for movement along an axis and engageable with said cam surface to set said variable characteristic.

5. The improvement as set forth in claim 4 wherein said cam surface is planar and is arranged perpendicular to the axis of follower motion.

6. In a mechanical module adapted to be interchangeably mounted on a body at any of a plurality of locations, said body having at each of said locations a particular geometry that cooperates with said module to mandate the relative position of said module with respect to said body at such location, said module having a housing and having a setting member arranged for movement relative to said housing within a permissible range to set a functional variable characteristic of said module, the improvement comprising:

the value of said variable characteristic being determined by the position of said setting member relative to said body, as constrained by said body geometry at any such location, said setting member and body being so configured and arranged as to permit said module to be mounted on said body at any such location only when said setting member is in the preselected position for such location, and to prevent said module from being mounted on said body when said setting member is in a position other than said preselected position for such location;

whereby said module is prevented from being mounted on said body unless said setting member is in said preselected position.

7. A torque-limiting module adapted to be mounted on a body at any of a plurality of locations, said body having at each location mounting features that mandate the relative position and orientation of said module relative to said body, said module comprising:

a housing adapted to be mounted on said body;

an input shaft;

an output shaft;

a coupling between said shafts;

a brake arranged to act between said housing and output shaft for selectively braking said shafts when the torque transmitted by said output shaft exceeds a predetermined torque value;

a cam surface mounted on said body at each of said locations; and a cam follower mounted on said module for movement along an axis, and engageable with said cam surface at any location; and wherein said module is operatively arranged to selectively set said predetermined torque value as a function of the position of said cam follower relative to said module;

whereby said predetermined torque value is set, either automatically during, or as a condition precedent to, mounting said module on said body at any of such locations.

8. The torque-limiting module as set forth in claim 7 wherein said cam surface is planar, and is perpendicular to the axis of cam follower movement.

9. The torque-limiting module as set forth in claim 7 and further comprising:

a spring urging said brake to move toward a position at which said output shaft will be released.

* * * * *